(12) United States Patent
Iglewski et al.

(10) Patent No.: US 12,553,917 B2
(45) Date of Patent: Feb. 17, 2026

(54) METHODS, APPARATUS, AND ARTICLES OF MANUFACTURE TO MEASURE PRESSURE OF A FLUID

(71) Applicant: GENERAL ELECTRIC COMPANY POLSKA SP. Z O.O, Warsaw (PL)

(72) Inventors: Tomasz Iglewski, Warsaw (PL); Aleksander Piotr Pasieczny, Warsaw (PL)

(73) Assignee: General Electric Company Polska Sp. Z o.o, Warsaw (PL)

( * ) Notice: Subject to any disclaimer, the term of this patent is extended or adjusted under 35 U.S.C. 154(b) by 579 days.

(21) Appl. No.: 17/987,566

(22) Filed: Nov. 15, 2022

(65) Prior Publication Data
US 2023/0366908 A1    Nov. 16, 2023

(30) Foreign Application Priority Data
May 13, 2022    (PL) .......................................... 441163

(51) Int. Cl.
*G01P 5/14*    (2006.01)
*B64D 43/02*    (2006.01)

(52) U.S. Cl.
CPC ................ *G01P 5/14* (2013.01); *B64D 43/02* (2013.01)

(58) Field of Classification Search
CPC .................................. G01P 5/14; B64D 43/02
USPC ...................................................... 73/861.42
See application file for complete search history.

(56) References Cited

U.S. PATENT DOCUMENTS

| | | | | |
|---|---|---|---|---|
| 2,280,411 | A | * | 4/1942 | Kiene ..................... G01L 23/02 73/756 |
| 3,646,811 | A | * | 3/1972 | DeLeo ...................... G01P 5/14 73/182 |
| 3,832,903 | A | | 9/1974 | Fletcher et al. |
| 4,170,899 | A | | 10/1979 | Fujita et al. |
| 4,522,070 | A | * | 6/1985 | Hagen ................. G01L 19/0007 73/182 |
| 5,929,331 | A | * | 7/1999 | Kinser .................. G01M 9/065 73/866.5 |
| 6,419,186 | B1 | * | 7/2002 | Bachinski ............. G01P 13/025 73/182 |
| 10,073,112 | B2 | | 9/2018 | Golovkin et al. |
| 10,884,015 | B2 | | 1/2021 | Louis et al. |

(Continued)

FOREIGN PATENT DOCUMENTS

| | | |
|---|---|---|
| CN | 105588703 A | 5/2016 |
| EP | 3819641 | 5/2021 |
| PL | 431491 A1 | 4/2021 |

OTHER PUBLICATIONS

Patent Office of the Republic of Poland, "Search Report," issued Mar. 10, 2023, in connection with Polish Patent Application No. 441163, 12 pages (including translation).

*Primary Examiner* — Nathaniel T Woodward
(74) *Attorney, Agent, or Firm* — Hanley, Flight & Zimmerman, LLC

(57) ABSTRACT

Methods, apparatus, and articles of manufacture to measure pressure of a fluid are disclosed. An example apparatus to measure a total pressure of a fluid includes a probe head including a plurality of ports, the plurality of ports fluidly coupled to a measurement chamber, and a pressure sensor operatively coupled to the measurement chamber to measure the total pressure inside the measurement chamber, the total pressure corresponding to fluid flow through one of the plurality of ports.

14 Claims, 6 Drawing Sheets

(56) References Cited

U.S. PATENT DOCUMENTS

| | | |
|---|---|---|
| 11,215,631 B2 | 1/2022 | Anderson et al. |
| 2002/0121135 A1 | 9/2002 | Rediniotis et al. |
| 2008/0163699 A1 | 7/2008 | Ben-Mansour et al. |
| 2018/0284148 A1* | 10/2018 | Remboski ................. G01P 5/14 |
| 2021/0116474 A1* | 4/2021 | Anderson ............. G01P 13/025 |

* cited by examiner

METHODS, APPARATUS, AND ARTICLES OF MANUFACTURE TO MEASURE PRESSURE OF A FLUID

RELATED APPLICATION

This patent claims priority to Polish Patent Application No. 441163, filed on May 13, 2022, which is incorporated herein by reference in its entirety.

TECHNICAL FIELD

This disclosure relates generally to pressure measurement and, more particularly, to methods, apparatus, and articles of manufacture to measure pressure of a fluid.

BACKGROUND

A pressure measurement device can be used to measure pressure of a flowing fluid. The pressure measurement device typically includes a probe to be inserted in a flow path of the fluid, and an opening of the probe is oriented opposite to a direction of flow. The fluid decelerates when flowing into the probe, and a total pressure of the fluid flowing along the flow path can be measured.

Figure 1:
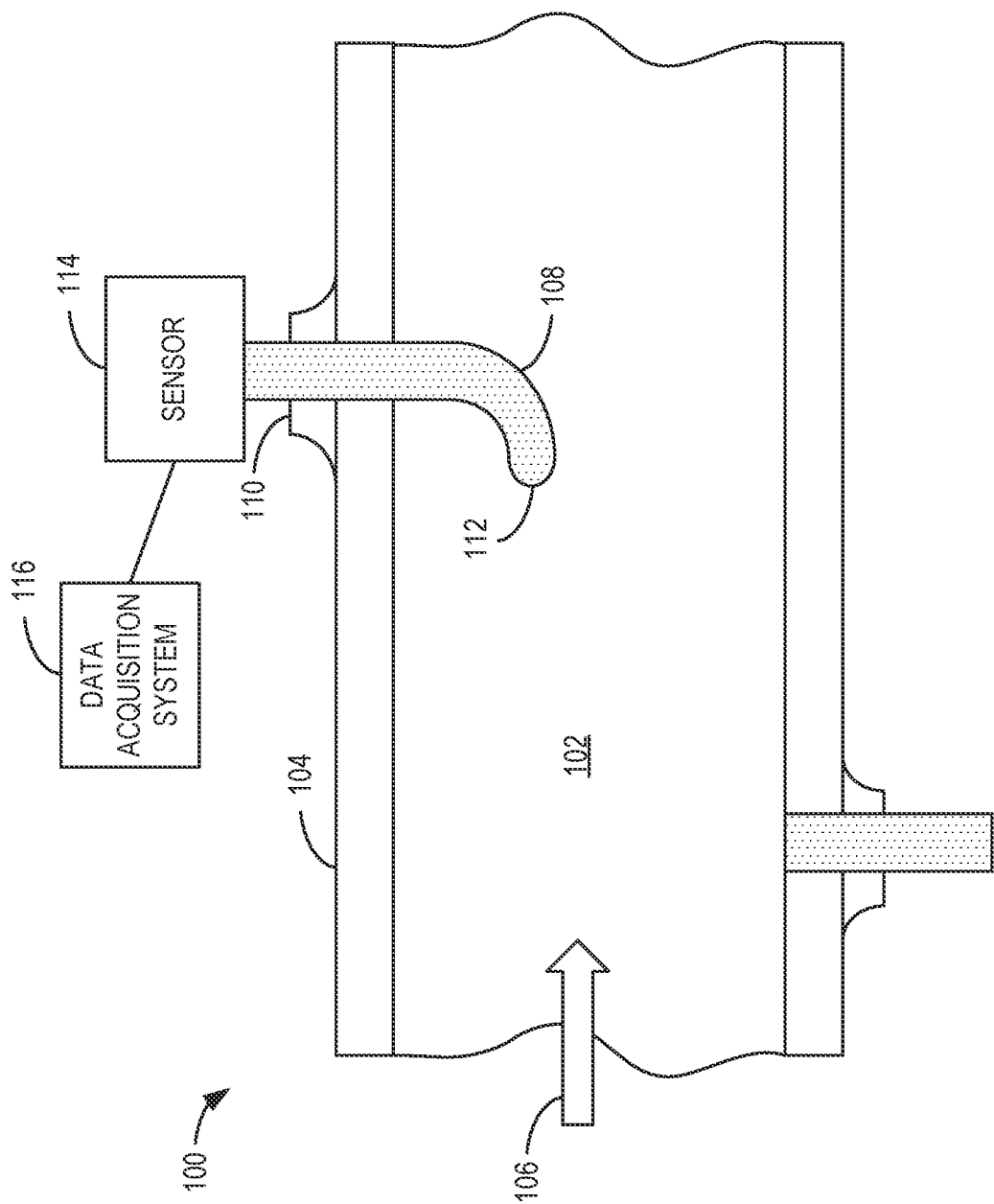
FIG. 1 illustrates a known pressure measurement setup for measuring pressure of fluid flowing through a fluid passageway.

In general, the same reference numbers will be used throughout the drawing(s) and accompanying written description to refer to the same or like parts. The figures are not to scale. Instead, the thickness of the layers or regions may be enlarged in the drawings. Although the figures show layers and regions with clean lines and boundaries, some or all of these lines and/or boundaries may be idealized. In reality, the boundaries and/or lines may be unobservable, blended, and/or irregular.

DETAILED DESCRIPTION

As used herein, unless otherwise stated, the term "above" describes the relationship of two parts relative to Earth. A first part is above a second part, if the first part has at least one part between Earth and the first part. Likewise, as used herein, a first part is "below" a second part when the first part is closer to the Earth than the second part. As noted above, a first part can be above or below a second part with one or more of: other parts therebetween, without other parts therebetween, with the first and second parts touching, or without the first and second parts being in direct contact with one another.

As used in this patent, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween.

As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc., may be used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

As used herein, "approximately" and "about" refer to dimensions that may not be exact due to manufacturing tolerances and/or other real world imperfections. As may be used herein "substantially real time" refers to occurrence in a near instantaneous manner recognizing there may be real world delays for computing time, transmission, etc. Thus, unless otherwise specified, "substantially real time" refers to real time +/−1 second.

As may be used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

In some applications, such as the design and control of aircraft, vehicles, and/or HVAC systems, it may be desirable to measure pressure of a fluid flowing along a fluid stream. A pressure measurement device can be used to measure the pressure of the fluid. In some cases, the pressure measurement device (e.g., a total pressure measurement device) includes a probe to be inserted in the fluid stream and oriented opposite and approximately parallel (e.g., within ±20 degrees) to a direction of flow. When fluid enters the probe, a velocity of the fluid reduces at a stagnation point at which a pressure sensor can measure a total pressure of the fluid flowing to the probe.

Typically, the flow direction of the fluid must be known in order to orient the probe against the flow direction. In some cases, the flow direction may vary over time (e.g., in a turbulent flow) and/or may be unknown, thus making it difficult to select an orientation of the probe. In some instances, to account for varying and/or unknown flow direction in a fluid stream, multiple pressure measurement devices may be used to determine the total pressure of the fluid. In such cases, multiple probes are inserted in the fluid stream and oriented in different directions. Corresponding pressure sensors measure the stagnation pressure of fluid flowing to the multiple probes, and a total pressure of the fluid in the fluid stream corresponds to a highest measured pressure from the multiple pressure sensors. In such cases, the multiple pressure sensors are communicatively coupled to respective channels of a data acquisition system (DAQ) to send measurement data thereto. As such, when using multiple pressure sensors to determine the total pressure in a fluid stream, a number of available channels of the DAQ is reduced, thus reducing functionality of the DAQ.

Examples disclosed herein enable total pressure measurement of fluid flowing in a fluid stream when a direction of flow is varying and/or unknown. In examples disclosed herein, an example omnidirectional probe can be inserted into the fluid stream, where the omnidirectional probe includes an example probe head having a plurality of example ports (e.g., openings) spaced across a surface of the probe head. In some examples, the ports are oriented in different directions, such that fluid can flow into the omnidirectional probe irrespective of the direction of flow. In some examples, each of the ports is fluidly coupled to a measurement chamber, and check valves are implemented along tubes connecting the ports to the measurement chamber. The measurement chamber is pressurized with fluid from a first port, where a pressure of fluid entering the first port is greater than the fluid pressure in remaining ones of the ports. In some examples, a pressure sensor is operatively coupled to the measurement chamber to measure the fluid pressure therein. The measured pressure corresponds to the fluid pressure in the first port and, thus, corresponds to a total pressure of fluid flowing in the fluid stream.

Advantageously, examples disclosed herein can be used when the flow direction of fluid in a fluid stream is unknown or varying. In particular, the example omnidirectional probe disclosed herein can be used to measure total pressure in a fluid stream when an incidence angle between the omnidirectional probe and the direction of flow is large (e.g., greater than 60 degrees). Additionally, by using one pressure sensor to measure the total pressure of fluid in the fluid stream, examples disclosed herein reduce the need for multiple probes with multiple corresponding pressure sensors and/or transducers, thus allowing more channels of a DAQ to be available for use in other applications. Furthermore, examples disclosed herein reduce parts costs by reducing a number of probes and/or sensors required for measuring the fluid pressure.

FIG. 1 illustrates a known pressure measurement setup 100 for measuring total pressure of fluid flowing through a fluid passageway 102 of a pipe 104. In FIG. 1, the fluid flows through the fluid passageway 102 in a flow direction 106, which is rightward as shown in FIG. 1. A known total pressure measurement device (e.g., a known measurement probe) 108 is inserted into the fluid passageway 102 via an opening 110 in the pipe 104. The known total pressure measurement device 108 is oriented in the fluid passageway 102 such that a probe head 112 of the known total pressure measurement device 108 is approximately opposite to the flow direction 106. As such, fluid can flow into the known total pressure measurement device 108 via the probe head 112, and a total pressure of the fluid can be measured by a sensor (e.g., a transducer) 114 operatively coupled to the known total pressure measurement device 108.

In FIG. 1, the known total pressure measurement device 108 is oriented against and/or otherwise opposite to the flow direction 106 in order to accurately measure the total fluid pressure. However, in some cases, the flow direction 106 may be unknown and/or may vary over time. In such cases, it may be difficult to appropriately orient the known total pressure measurement device 108 relative to the flow direction 106, resulting in incomplete and/or incorrect total pressure measurements. To account for a varying and/or unknown flow directions, one or more additional ones of the known total pressure measurement device 108 may be inserted in the fluid passageway 102 and oriented in different directions from the known total pressure measurement device 108 of FIG. 1. In such cases, a corresponding sensor 114 is operatively coupled to each of the known total pressure measurement devices 108 to measure the total fluid pressure therein, and the sensors 114 provide the total fluid pressure measurements to a DAQ 116 via respective channels. The DAQ 116 selects a total pressure measurement from one of the known total pressure measurement devices 108, where the selected total pressure measurement is greater than remaining ones of the total pressure measurements. In such cases, a total pressure of the fluid in the fluid passageway 102 corresponds to the selected total pressure measurement and/or is based on a combination of the total pressure measurements.

Figure 2:
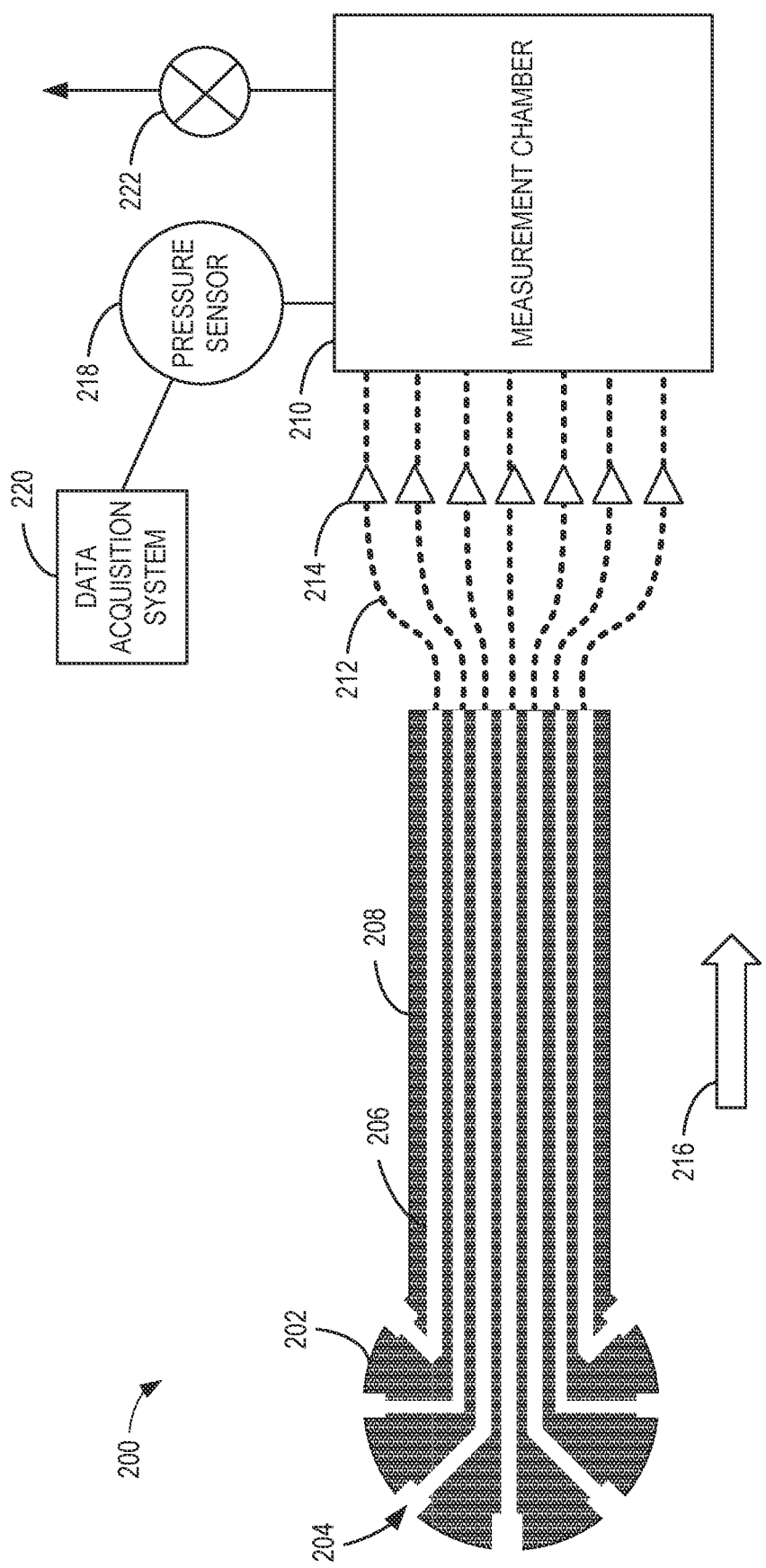
FIG. 2 illustrates an example omnidirectional probe in accordance with teachings of this disclosure.

FIG. 2 illustrates an example omnidirectional probe 200 in accordance with teachings of this disclosure. In some examples, the omnidirectional probe 200 can be used instead of the known total pressure measurement device 108 of FIG. 1 to measure total pressure of a flowing fluid. In the illustrated example of FIG. 2, the omnidirectional probe 200 includes an example probe head 202 to be inserted into a fluid stream. While the probe head 202 is spherical in this example, a different shape of the probe head 202 may be used instead. In the illustrated example, the probe head 202 includes a plurality of example ports 204 spaced across a surface thereof. While seven of the ports 204 are shown in this example, a different number of the ports 204 (e.g., 10, 25, 50, etc.) may be used instead. In some examples, an angle between adjacent ones of the ports 204 is between 15 and 20 degrees. In other examples, the angle between adjacent ones of the ports 204 may be different (e.g., up to 15 degrees, at least 20 degrees, at least 30 degrees, etc.). In some examples, the ports 204 are uniformly spaced across the surface of the probe head 202, such that the angle is the same between each adjacent pair of the ports 204. In other examples, angles between adjacent ones of the ports 204 may vary across the surface of the probe head 202. In some examples, the spacing and/or angles between the ports 204 allow the ports 204 to be oriented in different directions across the surface of the probe head 202.

In the illustrated example of FIG. 2, the ports 204 are fluidly coupled to respective example fluid channels 206 extending through an example neck portion 208 of the omnidirectional probe 200. In some examples, the fluid channels 206 are approximately straight (e.g., not curved and/or bent) and parallel to one another in the neck portion 208. In other examples, the fluid channels 206 may not be straight and/or parallel to one another or may otherwise vary from one to another in the neck portion 208. In some examples, the fluid channels 206 are provided in the neck portion 208 and/or the probe head 202 during manufacturing of the neck portion 208 and/or the probe head 202. For example, the fluid channels 206 may be provided by omitting portions of material during additive manufacturing of the neck portion 208 and/or the probe head 202. In other examples, the neck portion 208 and/or the probe head 202 are manufactured as solid (e.g., not hollow) components, and the fluid channels 206 are provided by removing material from the neck portion 208 and/or the probe head 202 to form openings (e.g., cavities, apertures) therein. In still other examples, the neck portion 208 and/or the probe head 202 may be manufactured as hollow components, and the fluid channels 206 are implemented as tubes therein.

In this example, the fluid channels 206 are fluidly coupled to an example measurement chamber 210 via corresponding example tubes (e.g., pressure tubes) 212. In some examples, the tubes 212 extend into the neck portion 208 to define the fluid channels 206. In this example, the tubes 212 are flexible tubes that can be curved and/or bent between the neck portion 208 and the measurement chamber 210. Furthermore, example check valves 214 are implemented and/or otherwise provided in the tubes 212. In this example, the check valves 214 enable fluid flow from the neck portion 208 to the measurement chamber 210, and restrict and/or prevent fluid flow from the measurement chamber 210 to the neck portion 208. In this example, one of the check valves 214 is implemented along each of the tubes 212. In other examples, two or more of the check valves 214 can be implemented along each of the tubes 212. In some examples, the check valves 214 include at least one of a membrane check valve or a disc check valve. Additionally or alternatively, the check valves 214 can include a Tesla check valve, which is described further below in connection with FIG. 3.

In the illustrated example of FIG. 2, fluid in a fluid stream flows in an example flow direction 216, which is rightward in FIG. 2. When the probe head 202 is inserted into the flow stream, fluid can enter the probe head 202 via one or more of the ports 204. In particular, because the ports 204 are oriented in different directions across the surface of the probe head 202, the fluid can enter the probe head 202 irrespective of an incidence angle between the probe head 202 and a flow direction of the fluid. As such, while the incidence angle in the illustrated example is approximately 0 degrees (e.g., the omnidirectional probe 200 is substantially opposite and parallel to the flow direction 216), the incidence angle can be different (e.g., greater than 10 degrees, greater than 30 degrees, greater than 60 degrees, etc.) in other examples.

In the illustrated example of FIG. 2, fluid entering the ports 204 decelerates and flows to the tubes 212 via corresponding ones of the fluid channels 206. The fluid further flows through the tubes 212 and the corresponding check valves 214 to the measurement chamber 210. In this example, first fluid from a first one of the ports 204 pressurizes the measurement chamber 210, where a pressure of the first fluid is greater than a pressure of fluid from remaining ones of the ports 204. As such, although fluid can flow to the measurement chamber 210 from multiple ones of the ports 204, the pressure of the first fluid in the measurement chamber 210 prevents and/or restricts flow of fluid into the measurement chamber 210 from the remaining ones of the ports 204. Stated differently, a total pressure in the measurement chamber 210 corresponds to a pressure of the first fluid from the first one of the ports 204.

In the illustrated example of FIG. 2, an example pressure sensor 218 is operatively coupled to the measurement chamber 210 to measure the total pressure therein. In some examples, the pressure sensor 218 is communicatively coupled to a channel (e.g., an input channel) of an example DAQ 220 to provide the measured total pressure thereto. In such examples, the pressure sensor 218 utilizes one channel of the DAQ 220, such that remaining channels of the DAQ 220 may be available for use in other applications. Thus, the omnidirectional probe 200 improves an efficiency of using the DAQ 220 compared to the known pressure measurement setup 100 of FIG. 1. In some examples, the DAQ 220 can monitor and/or control one or more systems based on the measured total pressure. For example, when the omnidirectional probe 200 is implemented on an exterior surface of an aircraft, the DAQ 220 can determine a speed of the aircraft based on the measured total pressure. In other examples, the omnidirectional probe 200 can be used to monitor fluid flow in an HVAC system, fluid flow in an inlet plenum of a vehicle engine, etc.

In the illustrated example of FIG. 2, an example relief valve 222 is implemented on the measurement chamber 210. In some examples, the relief valve 222 can open to release pressure from the measurement chamber 210 when the pressure therein exceeds a threshold pressure. For example, when external pressure suddenly drops below the pressure in the measurement chamber 210, air may become trapped in the check valves 214, and the trapped air can prevent and/or otherwise reduce flow to the measurement chamber 210. In such examples, the relief valve 222 can be opened (e.g., periodically) to release the trapped air and enable flow through the check valves 214, thus restoring functionality of the omnidirectional probe 200. In other examples, the relief valve 222 is not implemented on the measurement chamber 210. Instead, the check valves 214 are implemented as Tesla valves to enable small amounts of backflow of fluid from the measurement chamber 210. In such examples, the backflow of fluid through the check valves 214 relieves pressure from the measurement chamber 210. In such examples, the backflow of fluid can affect the total pressure measured by the pressure sensor 218. However, the effect of backflow on the measured total pressure can be accounted for during calibration of the omnidirectional probe 200.

In some examples, the probe head 202 implements probing means, the ports 204 implement fluid inlet means, the neck portion 208 implements supporting means, the fluid channels 206 implement fluid channel means, the measurement chamber 210 implements fluid containment means, the pressure sensor 218 implements sensing means, the relief valve 222 implements pressure relief means, the tubes 212 implement fluid passageway means, and the check valves 214 implement fluid control means.

Figure 3:
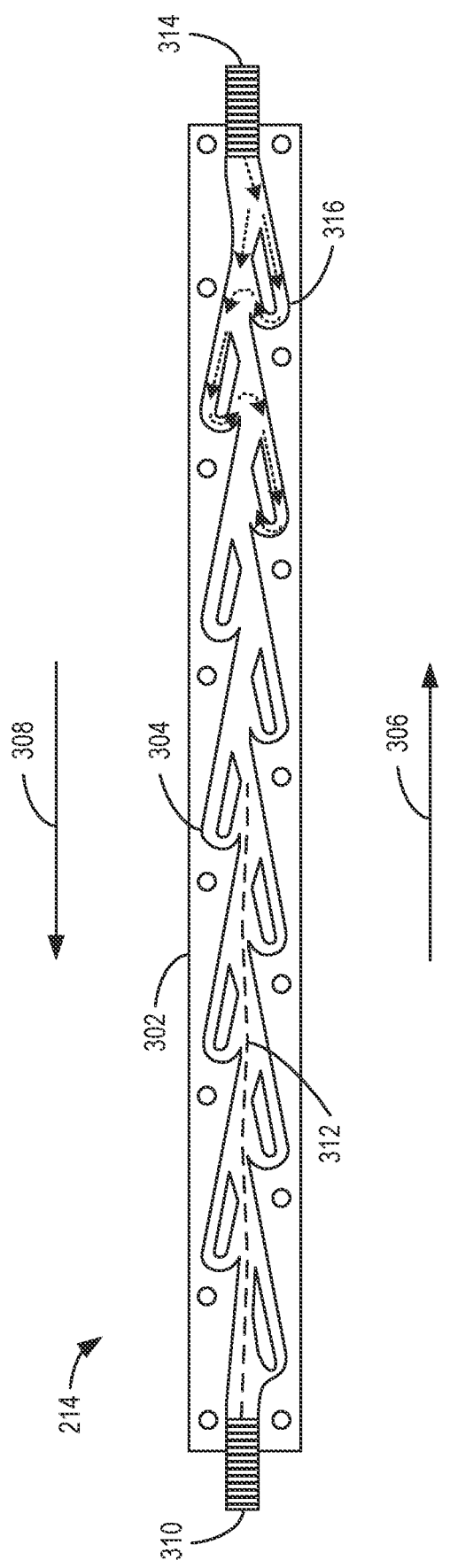
FIG. 3 illustrates an example check valve that can be implemented in the example omnidirectional probe of FIG. 2.

FIG. 3 illustrates a detailed view of one of the example check valves 214 that can be implemented in the example omnidirectional probe 200 of FIG. 2. In the illustrated example of FIG. 3, the check valve 214 is a Tesla valve (e.g., a Tesla check valve). As such, the example check valve 214 is a passive valve that does not include moving parts. While a Tesla valve is described in FIG. 3, a different type of the check valves 214 can be used instead. In this example, the check valve 214 includes an example valve body 302 and an example cavity (e.g., a recess) 304 provided in the valve body 302. In this example, the cavity 304 enables fluid flow in an example rightward direction 306 in FIG. 2, and restricts fluid flow in an example leftward direction 308 in FIG. 2. In particular, when fluid is provided to the cavity 304 at a first example inlet 310, the fluid flows generally in the rightward direction 306 along an example central path 312 through the cavity 304. In such cases, the fluid experiences little to no resistance when flowing in the rightward direction 306.

Alternatively, when fluid is provided to the cavity 304 at a second example inlet 314, the fluid resists flowing in the leftward direction 308. For example, a first portion of the fluid entering the second inlet 314 is directed along example alternate paths (e.g., looped paths) 316 through the cavity 304, and a second portion of the fluid flows along the central path 312. When the first portion of the fluid exits the alternate paths 316 and interacts and/or otherwise mixes with the second portion of the fluid along the central path 312, the mixing of fluids provides resistance to the fluid flow in the leftward direction 308. Further mixing occurs at each interaction between fluid along the central path 312 and fluid along subsequent ones of the alternate paths 316, such that resistance to the fluid flow increases as the fluid flows in the leftward direction 308. In some examples, when the fluid flow in the leftward direction 308 is unable to overcome the resistance caused by the mixing of fluids, fluid is prevented from further flowing in the leftward direction 308 through the cavity 304. Thus, the check valve 214 restricts and/or otherwise prevents fluid flow from the second inlet 314 to the first inlet 310, while allowing fluid to flow from the first inlet 310 to the second inlet 314. While eleven of the alternate paths 316 are provided in the cavity 304 in this example, a different number of the alternate paths 316 may be used instead. In some examples, the check valve 214 of FIG. 3 can be manufactured using additive manufacturing.

Figure 4:
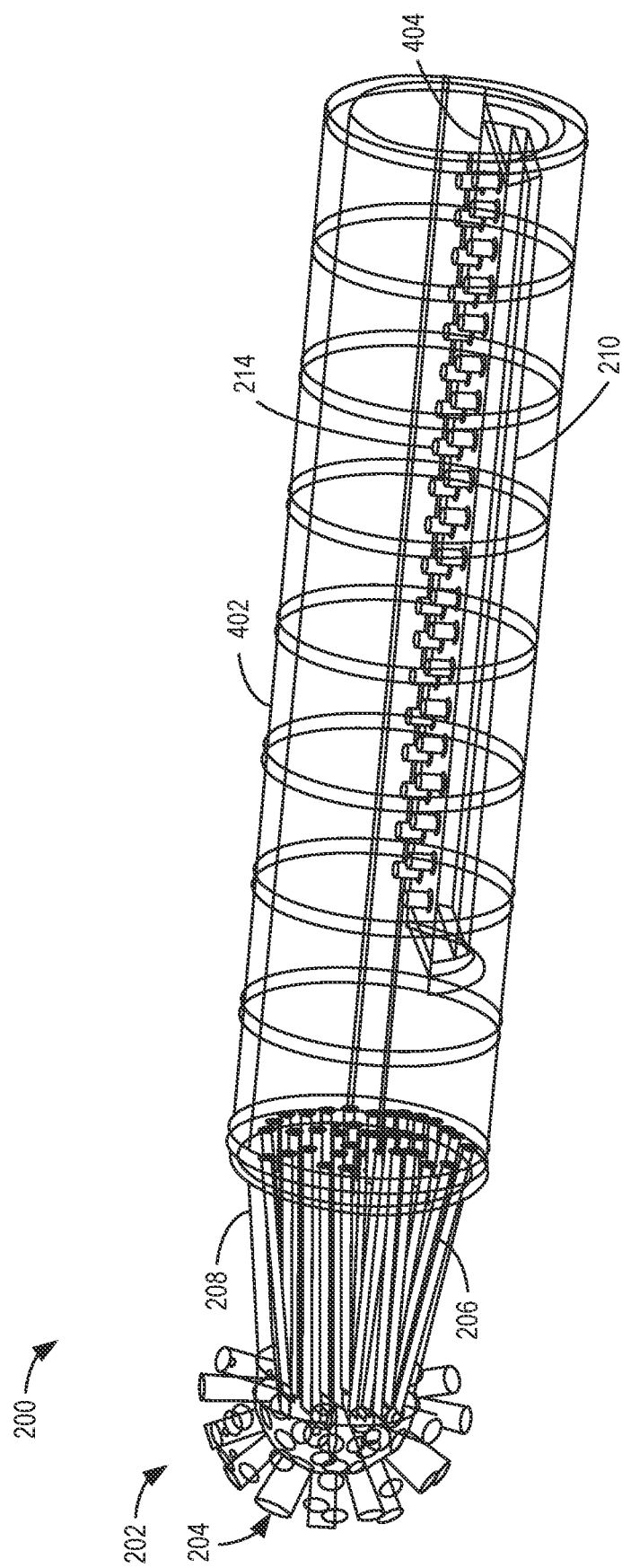
FIG. 4 is a transparent view of the example omnidirectional probe of FIG. 2.

FIG. 4 illustrates a transparent view of the example omnidirectional probe 200 of FIG. 2. In the illustrated example of FIG. 4, each of the ports 204 protrudes from a hemispherical surface of the probe head 202. The example neck portion 208 couples the probe head 202 to an example probe body 402 of the omnidirectional probe 200. In this example, the probe body 402 is cylindrical and has a first cross-sectional dimension (e.g., a first cross-sectional diameter). Furthermore, the probe head 202 has a second cross-sectional dimension (e.g., a second cross-sectional diameter) smaller than the first cross-sectional dimension of the probe body 402, such that the neck portion 208 tapers from the probe body 402 to the probe head 202. While the probe body 402 is cylindrical in this example, a different shape of the probe body 402 may be used instead.

In the illustrated example of FIG. 4, the example measurement chamber 210 is disposed in the probe body 402. In this example, the check valves 214 are disposed in and/or arranged in an array across an example wall 404 of the measurement chamber 210. In some examples, the example tubes 212 of FIG. 2 are used to fluidly couple the fluid channels 206 in the neck portion 208 to corresponding ones of the check valves 214, thus fluidly coupling the ports 204 to the measurement chamber 210. In some examples, at least one of the probe head 202, the neck portion 208, the probe body 402, the measurement chamber 210, or the check valves 214 can be manufactured together or separately using additive manufacturing.

Figure 5:
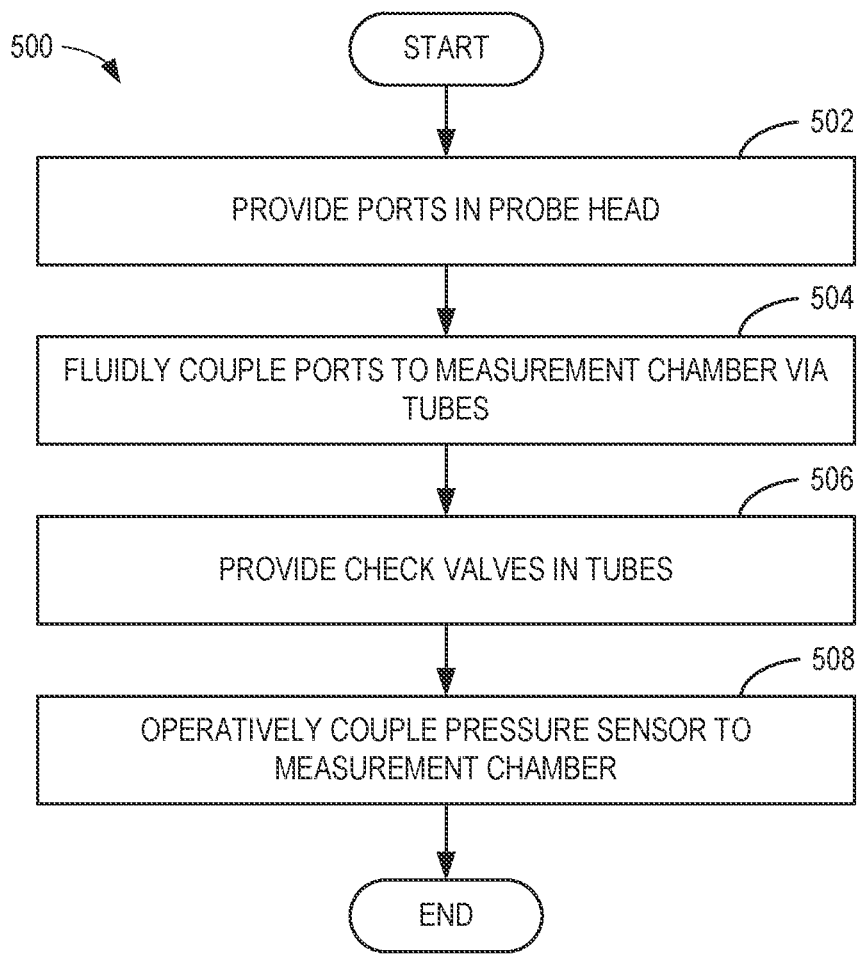
FIG. 5 is a flowchart representative of an example method to produce examples disclosed herein.

FIG. 5 is a flowchart representative of an example method 500 to produce examples disclosed herein. For example, the method 500 of FIG. 5 can be used to produce the example omnidirectional probe 200 of FIGS. 2 and/or 4. The example method 500 begins at block 502, at which the example ports 204 are provided in the example probe head 202 of FIGS. 2 and/or 4. For example, the ports 204 are spaced (e.g., uniformly) across a surface of the probe head 202. In some examples, the ports 204 are oriented in different directions. For example, the ports 204 are oriented such that an angle between adjacent ones of the ports 204 is between 15 degrees and 20 degrees.

At block 504, the example ports 204 are fluidly coupled to the example measurement chamber 210 of FIGS. 2 and/or 4 via the example tubes 212 of FIG. 2. For example, the ports 204 are fluidly coupled to the example fluid channels 206 of the example neck portion 208 of FIGS. 2 and/or 4, and the fluid channels 206 are further fluidly coupled to the measurement chamber 210 via the tubes 212.

At block 506, the example check valves 214 of FIGS. 2, 3, and/or 4 are provided and/or otherwise disposed in the example tubes 212. For example, the check valves 214 are disposed in the tubes 212 and fluidly coupled between the fluid channels 206 and the measurement chamber 210. In other examples, the check valves 214 are disposed in and/or arranged in an array on the example wall 404 of the measurement chamber 210 of FIG. 4. In such examples, the tubes 212 fluidly couple the check valves 214 to the fluid channels 206.

At block 508, the example pressure sensor 218 of FIG. 2 is operatively coupled to the example measurement chamber 210. For example, the pressure sensor 218 is coupled to the measurement chamber 210 to measure a total pressure (e.g., a stagnation pressure) therein. In some examples, the pressure sensor 218 is further operatively and/or communicatively coupled to a channel of the example DAQ 220 to provide the measured total pressure thereto.

Figure 6:
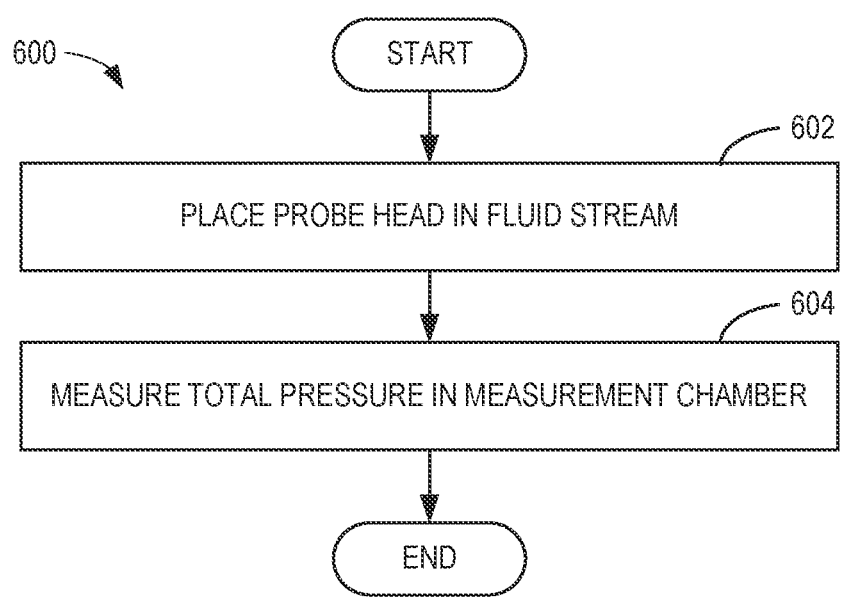
FIG. 6 is a flowchart representative of an example method to measure fluid pressure using examples disclosed herein.

FIG. 6 is a flowchart representative of an example method 600 to measure fluid pressure using examples disclosed herein. For example, the method 600 of FIG. 6 can be used to measure fluid pressure using the example omnidirectional probe 200 of FIGS. 2 and/or 4. The example method 600 begins at block 602, at which the example probe head 202 of FIGS. 2 and/or 4 is placed and/or otherwise inserted into a fluid stream. For example, the probe head 202 is placed on an exterior surface of an aircraft, in an inlet plenum of a vehicle engine, in an HVAC system, etc. In such examples, fluid can flow into one or more of the example ports 204 of FIGS. 2 and/or 4, and further flow through corresponding ones of the fluid channels 206, the tubes 212, and the check valves 214 to the measurement chamber 210.

At block 604, a total pressure of fluid inside the example measurement chamber 210 is measured using the example pressure sensor 218 of FIG. 2. For example, the pressure sensor 218 measures the total pressure, and provides the measured total pressure to a channel of the example DAQ 220 of FIG. 2 for using in controlling and/or monitoring one or more systems. For example, the DAQ 220 can use the measured total pressure to monitor speed of an aircraft, fluid flow in an HVAC system, fluid flow in an inlet plenum of a vehicle engine, etc.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

From the foregoing, it will be appreciated that example systems, methods, apparatus, and articles of manufacture have been disclosed that measure pressure of a fluid in a fluid stream. An example omnidirectional probe disclosed herein includes a plurality of ports fluidly coupled to a measurement chamber, where the ports are oriented in different directions across a surface of a probe head. The measurement chamber is pressurized by fluid from one of the ports, and a pressure sensor can measure the total pressure of the fluid in the fluid stream by measuring a pressure inside the measurement chamber. By enabling fluid to flow into the probe head from multiple directions, examples disclosed herein can be used to measure fluid pressure when the flow direction of fluid is unknown and/or varying. Furthermore, by using one pressure sensor to measure the total pressure of fluid in the fluid stream, examples disclosed herein reduce the need for multiple probes with multiple corresponding pressure sensors and/or transducers. Thus, disclosed systems, methods, apparatus, and articles of manufacture improve the efficiency of using a computing device by reducing a number of channels of a DAQ utilized for determining total pressure of a fluid, thus increasing a number of channels available for use in other applications. Disclosed systems, methods, apparatus, and articles of manufacture are accordingly directed to one or more improvement(s) in the operation of a machine such as a computer or other electronic and/or mechanical device.

Example methods, apparatus, systems, and articles of manufacture to measure pressure of a fluid are disclosed herein. Further aspects are provided by the subject matter of the following clauses:

An apparatus to measure a total pressure of a fluid, the apparatus comprising a probe head including a plurality of ports, the plurality of ports fluidly coupled to a measurement chamber, and a pressure sensor operatively coupled to the measurement chamber to measure the total pressure inside the measurement chamber, the total pressure corresponding to fluid flow through one of the plurality of ports.

The apparatus of any preceding clause, wherein at least two of the plurality of ports are oriented in different directions.

The apparatus of any preceding clause, wherein the plurality of ports are spaced about a surface of the probe head.

The apparatus of any preceding clause, further including a relief valve operatively coupled to the measurement chamber, the relief valve to open periodically.

The apparatus of any preceding clause, further including a plurality of tubes to fluidly couple the plurality of ports to the measurement chamber, at least one check valve provided in the plurality of tubes.

The apparatus of any preceding clause, wherein the at least one check valve enables backflow from the measurement chamber.

The apparatus of any preceding clause, wherein an incidence angle between a direction of the fluid flow and the probe head is greater than 60 degrees.

The apparatus of any preceding clause, wherein the probe head is mounted on an exterior surface of an aircraft, the total pressure to indicate a speed of the aircraft.

The apparatus of any preceding clause, wherein the probe head is spherical, the plurality of ports spaced uniformly about a surface of the probe head.

The apparatus of any preceding clause, wherein an angle between adjacent ports of the plurality of ports is between 15 and 20 degrees.

The apparatus of any preceding clause, wherein the at least one check valve includes at least one of a membrane check valve, a disc check valve, or a Tesla check valve.

The apparatus of any preceding clause, wherein the at least one check valve is disposed in an array on a wall of the measurement chamber.

The apparatus of any preceding clause, further including a neck portion coupled to the probe head, a plurality of fluid channels provided in the neck portion, the plurality of fluid channels fluidly coupled between the plurality of ports and the plurality of tubes.

The apparatus of any preceding clause, wherein the neck portion is hollow, the plurality of fluid channels provided as tubes within the neck portion.

The apparatus of any preceding clause, wherein the neck portion is solid, the plurality of fluid channels provided as openings within the neck portion.

An apparatus comprising probing means including fluid inlet means, the fluid inlet means fluidly coupled to fluid containment means, and sensing means operatively coupled to the fluid containment means to measure total pressure inside the fluid containment means, the total pressure corresponding to fluid flow through one of the fluid inlet means.

The apparatus of any preceding clause, wherein at least two of the fluid inlet means are oriented in different directions.

The apparatus of any preceding clause, wherein the fluid inlet means are spaced about a surface of the probing means.

The apparatus of any preceding clause, further including pressure relief means operatively coupled to the fluid containment means, the pressure relief means to open periodically.

The apparatus of any preceding clause, further including fluid passageway means to fluidly couple the fluid inlet means to the fluid containment means, fluid control means provided in each of the fluid passageway means.

The apparatus of any preceding clause, wherein the fluid control means enables backflow from the fluid containment means.

The apparatus of any preceding clause, wherein an incidence angle between a direction of the fluid flow and the probing means is greater than 60 degrees.

The apparatus of any preceding clause, wherein the probing means is spherical, the fluid inlet means spaced uniformly about a surface of the probing means.

The apparatus of any preceding clause, wherein an angle between adjacent fluid inlet means is between 15 and 20 degrees.

The apparatus of any preceding clause, wherein the fluid control means includes at least one of a membrane check valve, a disc check valve, or a Tesla check valve.

The apparatus of any preceding clause, wherein the fluid control means are disposed in an array on a wall of the fluid containment means.

The apparatus of any preceding clause, further including supporting means coupled to the probing means, fluid channel means provided in the supporting means, the fluid channel means fluidly coupled between the fluid inlet means and the fluid passageway means.

The apparatus of any preceding clause, wherein the supporting means is hollow, the fluid channel means provided as tubes within the supporting means.

The apparatus of any preceding clause, wherein the supporting means is solid, the fluid channel means provided as openings within the supporting means.

A method of manufacturing a pressure measurement apparatus, the method comprising providing a plurality of ports in a probe head, fluidly coupling, via a plurality of tubes, the plurality of ports to a measurement chamber, and operatively coupling a pressure sensor to the measurement chamber to measure a total pressure inside the measurement chamber, the total pressure corresponding to fluid flow through one of the plurality of ports.

The method of the preceding clause, further including orienting at least two of the plurality of ports in different directions.

The method of any preceding clause, further including spacing the plurality of ports about a surface of the probe head.

The method of any preceding clause, further including providing check valves in the plurality of tubes, the check valves to enable backflow from the measurement chamber.

The method of any preceding clause, wherein the probe head is spherical, further including uniformly spacing the plurality of ports about a surface of the probe head.

The method of any preceding clause, wherein providing the check valves includes providing at least one of a membrane check valve, a disc check valve, or a Tesla check valve in the plurality of tubes.

The method of any preceding clause, further including disposing the check valves in an array on a wall of the measurement chamber.

The method of any preceding clause, further including coupling a neck portion to the probe head, and providing a plurality of fluid channels in the neck portion, the plurality of fluid channels fluidly coupled between the plurality of ports and the plurality of tubes.

The method of any preceding clause, wherein the neck portion is hollow, and wherein providing the plurality of fluid channels includes providing tubes within the neck portion.

The method of any preceding clause, wherein the neck portion is solid, and wherein providing the plurality of fluid channels includes providing openings within the neck portion.

The method of any preceding clause, further including operatively coupling a relief valve to the measurement chamber.

The following claims are hereby incorporated into this Detailed Description by this reference. Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

What is claimed is:

1. An apparatus to measure a total pressure of a fluid, the apparatus comprising:
   a probe head including a plurality of ports spaced about a surface of the probe head and oriented in a plurality of directions to form an omnidirectional probe such that the fluid is to flow into at least one of the plurality of ports regardless of the direction of fluid flow, the plurality of ports fluidly coupled to a measurement chamber by a plurality of tubes; and
   a pressure sensor operatively coupled to the measurement chamber to measure the total pressure inside the measurement chamber, the total pressure corresponding to fluid flow through one of the plurality of ports.

2. The apparatus of claim 1, further including a relief valve operatively coupled to the measurement chamber, the relief valve to open periodically.

3. The apparatus of claim 1, wherein at least one check valve is provided in the plurality of tubes.

4. The apparatus of claim 3, wherein the at least one check valve enables backflow from the measurement chamber.

5. The apparatus of claim 1, wherein an incidence angle between a direction of the fluid flow and the probe head is greater than 60 degrees.

6. The apparatus of claim 1, wherein the probe head is mounted on an exterior surface of an aircraft, the total pressure to indicate a speed of the aircraft.

7. An apparatus comprising:
   probing means including a plurality of fluid inlet means spaced about a surface of the probing means and oriented in a plurality of directions to form an omnidirectional probe such that fluid is to flow into at least one of the plurality of fluid inlet means regardless of the direction of fluid flow, the plurality of fluid inlet means fluidly coupled to fluid containment means by fluid passageway means; and
   sensing means operatively coupled to the fluid containment means to measure total pressure inside the fluid containment means, the total pressure corresponding to fluid flow through one of the fluid inlet means.

8. The apparatus of claim 7, further including pressure relief means operatively coupled to the fluid containment means, the pressure relief means to open periodically.

9. The apparatus of claim 7, wherein fluid control means is provided in each of the fluid passageway means.

10. The apparatus of claim 9, wherein the fluid control means enables backflow from the fluid containment means.

11. The apparatus of claim 7, wherein an incidence angle between a direction of the fluid flow and the probing means is greater than 60 degrees.

12. A method of manufacturing a pressure measurement apparatus, the method comprising:
   providing a plurality of ports in a probe head, the plurality of ports spaced about a surface of the probe head and oriented in a plurality of directions to form an omnidirectional probe such that fluid is to flow into at least one of the plurality of ports regardless of the direction of fluid flow;
   fluidly coupling, via a plurality of tubes, the plurality of ports to a measurement chamber; and
   operatively coupling a pressure sensor to the measurement chamber to measure a total pressure inside the measurement chamber, the total pressure corresponding to fluid flow through one of the plurality of ports.

13. The method of claim 12, further including providing check valves in the plurality of tubes, the check valves to enable backflow from the measurement chamber.

14. The method of claim 13, further including operatively coupling a relief valve to the measurement chamber.

* * * * *